United States Patent [19]
Jusionis

[11] Patent Number: 5,288,963
[45] Date of Patent: Feb. 22, 1994

[54] ACTIVELY COOLED WELD HEAD CASSETTE

[75] Inventor: Vytautas J. Jusionis, Fountain Valley, Calif.

[73] Assignee: Hobart Brothers Company, Troy, Ohio

[21] Appl. No.: 95,906

[22] Filed: Jul. 22, 1993

[51] Int. Cl.⁵ .............................................. B23K 9/02
[52] U.S. Cl. ..................................... 219/60 A; 219/75
[58] Field of Search ................... 219/60 A, 75, 137.62

[56] References Cited

U.S. PATENT DOCUMENTS

| | | |
|---|---|---|
| 4,554,429 | 11/1985 | Kazlauskas .................. 219/60 A |
| 5,220,144 | 6/1993 | Jusionis ........................ 219/60 A |

*Primary Examiner*—Clifford C. Shaw
*Attorney, Agent, or Firm*—Biebel & French

[57] ABSTRACT

An orbital welding head for joining two tubes positioned end-to-end includes a welding electrode which is rotated around the tubes and a pair of clamps for holding the tubes in the correct position with respect to each other and the welding electrode. The clamps include a fixed member, a rotatable member and a hinge assembly for joining the rotatable member to the fixed member. The rotatable clamp members are moved clear of the tubes when the tubes are either inserted into or removed from the welding head. Fluid channels are formed in both the fixed and rotatable clamp members. The hinge assembly connects the rotatable clamp member with the fixed member. Fluid channels within the hinge assembly allows cooling fluid introduced into the fixed member to be carried through that member into the rotatable member, cooling both. A return fluid channel is also provided by the hinge. The hinge is provided with a passageway for transferring cooling fluid from one rotatable clamp member to another. Because the rotatable clamp members are cooled, they can be opened by the operator without requiring the use of gloves.

6 Claims, 6 Drawing Sheets

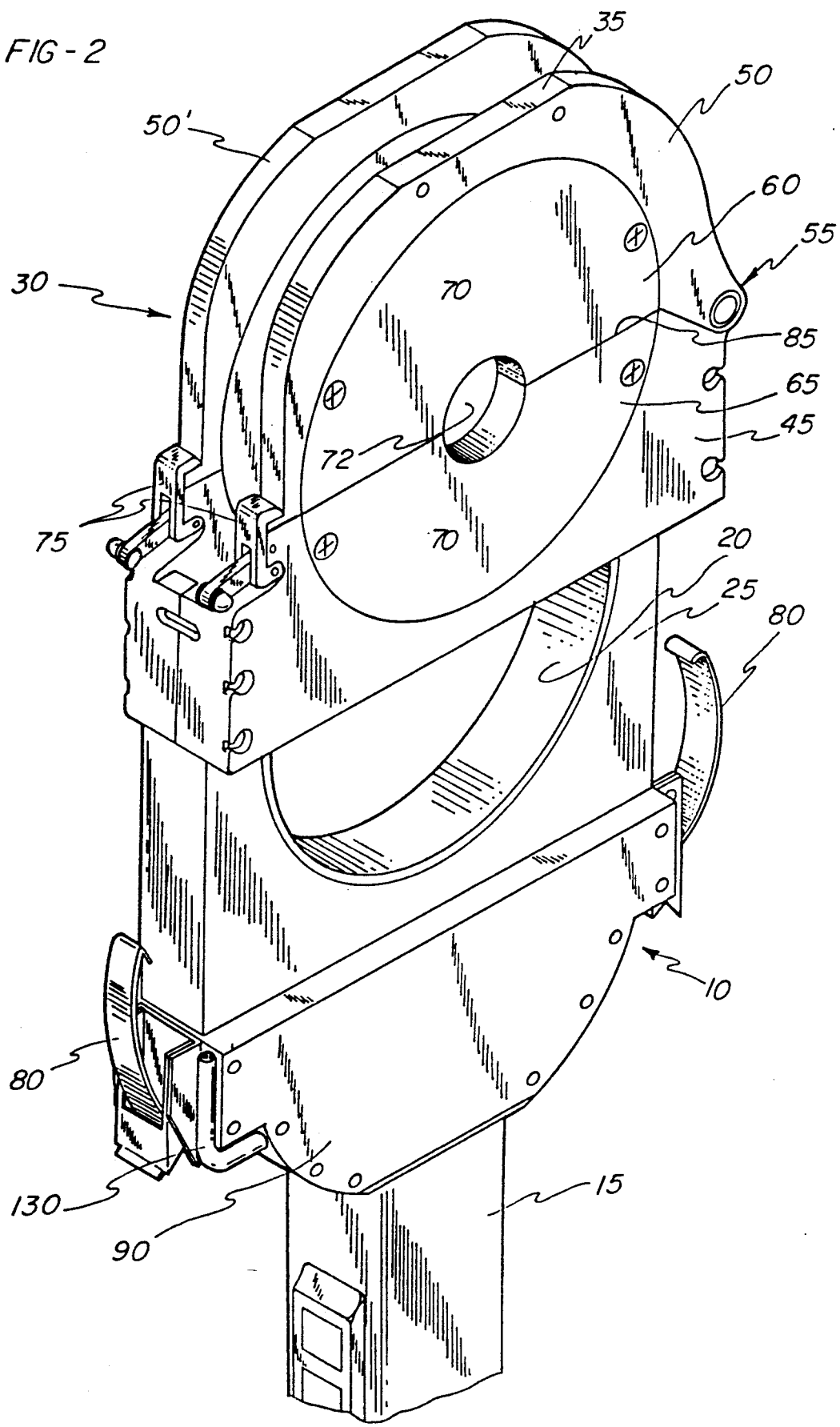

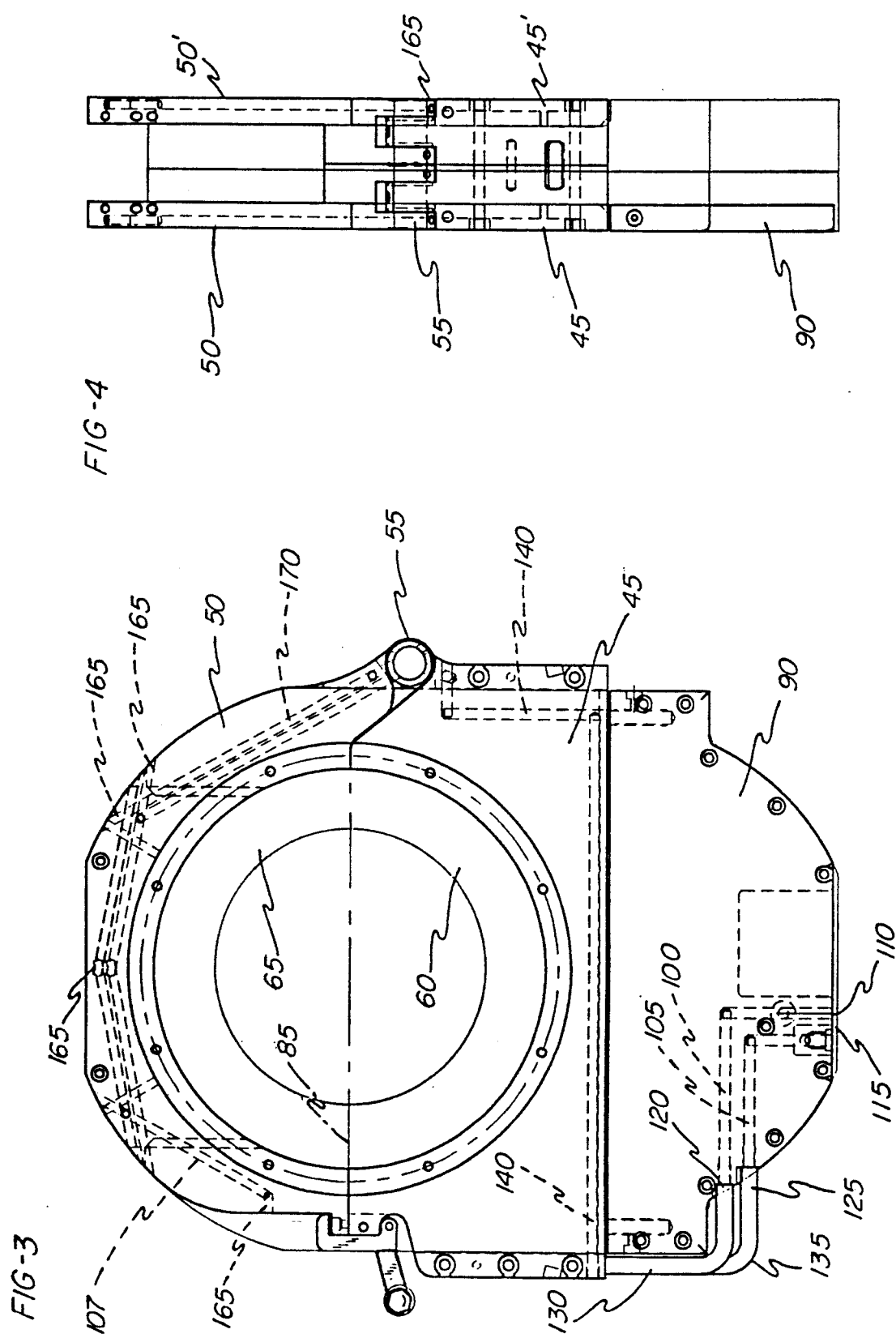

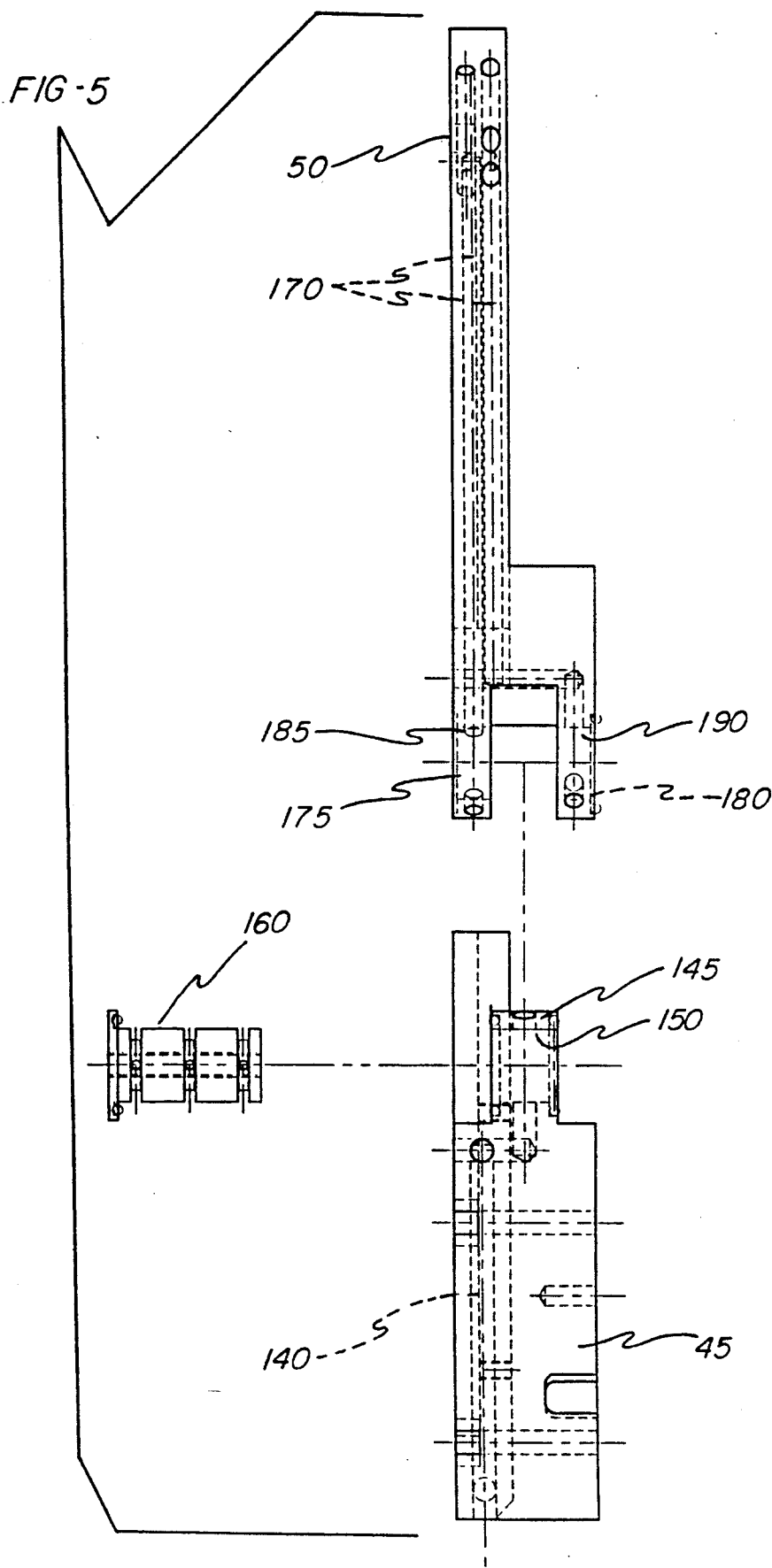

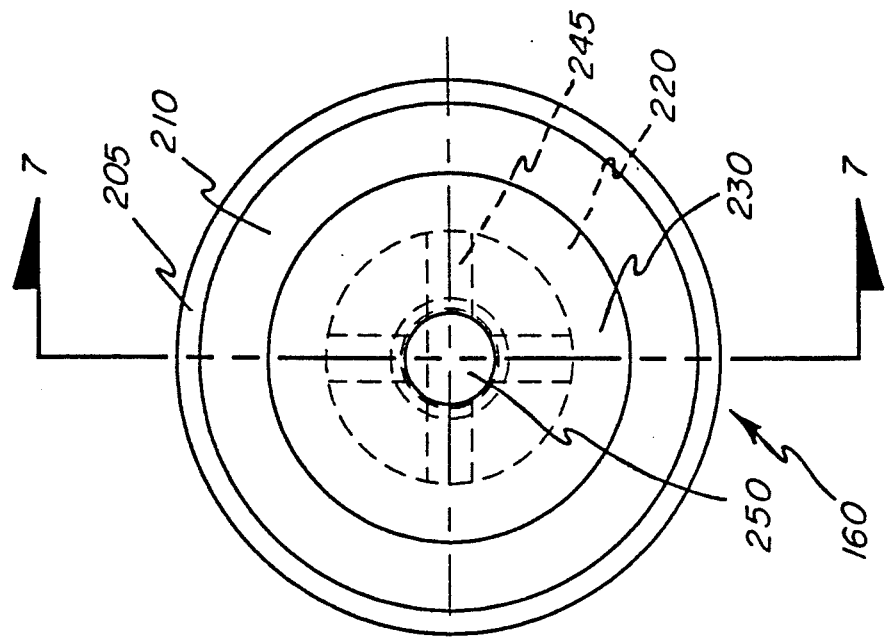
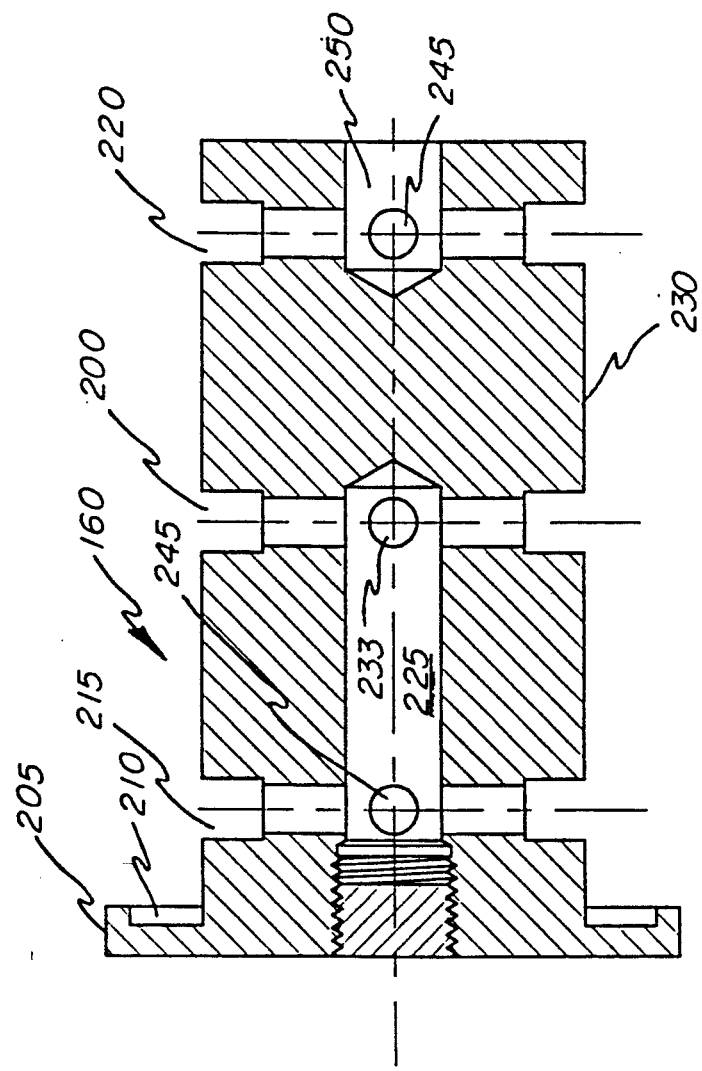
FIG-8
FIG-7

ACTIVELY COOLED WELD HEAD CASSETTE

BACKGROUND OF THE INVENTION

This invention relates to an improved tube-to-tube welding head.

A typical tube-to-tube welding head for joining two tubes positioned end-to-end includes a welding electrode, which is rotated around the joint between the tubes and a pair of clamps for holding the tubes in the correct position with respect to each other and the welding electrode. The clamps include a fixed member, a rotatable member and a hinge to permit the rotatable member to be moved clear of the tubes when the tubes are either inserted into or removed from the welding head. One such device is shown in U.S. Pat. No. 5,220,144.

When welding large diameter tubes, such as tubes up to five inches in diameter, the welding operation takes considerable time, up to four or five minutes, and as a consequence, the entire welding head becomes hot, 300° F. to 400° F. or higher. Once the welding operation is completed, the clamps are released, and the welding head is removed from the now joined tubes. Because the welding head is so hot, however, the operator must wear gloves to handle the release of the clamps and the installation of the welding head and closure of the clamps on the next pair of tubes to be welded.

In one prior art device, the clamp members are provided with passages through which cooling fluid was passed to reduce the temperature. Cooling of the clamp members can bring their temperature down considerably, from ambient to approximately 140° F. In that device, the cooling passages of the rotatable member were connected by flexible hoses to the fixed components of the welding head. External hoses in the vicinity of the hinge necessarily extended outwardly from the welding head and thus were in the way of a smooth and efficient operation, especially in confined spaces. Further, exposed hoses are subject to breaking or damage.

SUMMARY OF THE INVENTION

In the present invention, a tube-to-tube welding head is provided with cooling of the clamp members with cooling fluid being circulated between the rotatable clamp member and the fixed clamp member by means of a fluid coupling contained within a hinge assembly that connects these two members.

In the preferred embodiment, the fixed clamp member is provided with a cooling passageway having an inlet and an outlet which terminates at the hinge assembly. The rotatable clamp is provided with a cooling passageway that begins and ends at the hinge assembly. The hinge assembly not only connects the rotatable clamp member with the fixed member, but it contains fluid channels for transferring cooling fluid from the fixed member to the rotatable member. Since two clamps are used in a tube-to-tube welding head, the hinge assembly further includes a fluid channel for interconnecting the front clamp with the rear clamps.

It is therefore an object of this invention to provide means for cooling the clamps of a welding head wherein passages are formed in the clamp members and wherein the hinge joining a rotatable clamp member with a fixed clamp member is provided with fluid passageways thereby eliminating external hoses in the vicinity of the clamps.

It is another object of this invention to provide a novel method of cooling the clamp members of a welding head wherein the clamps include a fixed component and a rotatable component which is hinged for rotation, the method comprising the steps of forming a cooling channel within the fixed and movable clamp components, and connecting the cooling channel of one clamp component with the cooling channel of the other clamp component through the hinge joining the two components.

It is a further object of this invention to provide, in an orbital welding head for joining two tubes positioned end-to-end, the welding head including a welding electrode, means for rotating the electrode around the tubes, and a pair of clamps for holding the tubes in correct position with respect to each other and the welding electrode, each of the pair of clamps including a fixed member, a rotatable member, and a hinge assembly for joining the rotatable member to the fixed member to allow the rotatable member to be rotated and thus to allow the tubes to be inserted into and removed from the welding head, the improvement comprising cooling channels formed in the fixed member and in the rotatable member for carrying cooling fluid through the members, and fluid channels in the hinge assembly for connecting the cooling channel in the fixed member with the cooling channel in the rotatable member to provide a path for cooling fluid to flow through each of the clamp members.

Other objects and advantages of the invention will be apparent from the following description, the accompanying drawings and the appended claims.

BRIEF DESCRIPTION OF THE DRAWINGS

FIG. 2 is a perspective view of the welding head with the cassette assembly partially removed from the body of the welding head;

FIG. 3 is a front elevational view of the cassette assembly, showing the cassette assembly in its closed position and attached to the welding head body;

FIG. 4 is a side elevational view of FIG. 3;

FIG. 5 is an exploded side elevational view of one clamp showing a rotatable member, a fixed member and a hinge;

FIG. 7 is an front cross sectional view of a hinge used with the present invention; and FIG. 8 is an end view of the hinge shown in FIG. 7.

DESCRIPTION OF THE PREFERRED EMBODIMENT

Figure 1:
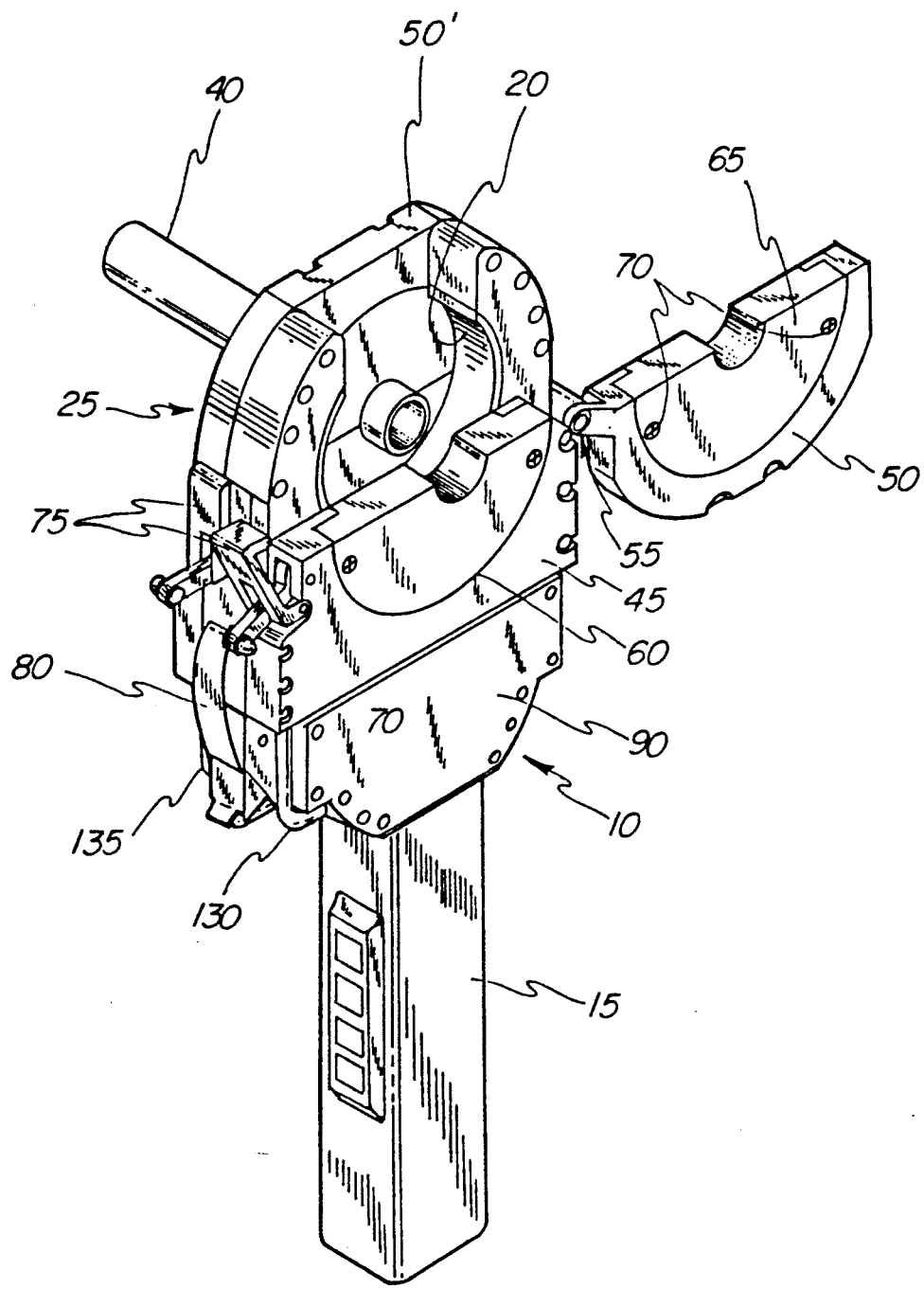
FIG. 1 is a perspective view of a welding head with the rotatable member of one tube clamp in the open position, ready to receive a tube section to be welded, and the other clamp closed with a tube section properly installed.

Reference is now made to the drawings which illustrate a preferred embodiment of this invention, and particularly to FIGS. 1 and 2 which are perspective views of a tube-to-tube welding head 10. A welding head body 15 includes a motor and a horseshoe shaped gear (not shown) for rotating a welding electrode 20 that is supported within a head assembly 25. The electrode is adjustable radially to accommodate tubes of different diameters. A more complete description of the operation of the electrode rotating mechanism is found in U.S. Pat. No. 5,220,144.

A removable cassette 30 is installed on the head assembly 25 to provide support for the tubes to be welded. As shown in FIG. 2, the cassette 30 is partially removed. The cassette includes a pair of clamps 35 for hold the tubes 40, one of which is shown in FIG. 1, in place with respect to each other and in proper position relative to the welding electrode 20. Each clamp 35 include a fixed member 45, a rotatable member 50, and a hinge assembly 55. As shown in FIG. 1, the rotatable member of one tube clamp is in the open position, ready to receive a tube section to be welded, and the other clamp is shown closed with a tube 40 section properly installed.

Collets 60 and 65 are installed in the clamp members 45 and 50, respectively, by means of screws 70. Each collet is a half circle provided with semi-circular opening 72. When the collets are joined, a central opening is formed, the inside diameter of which is the diameter as the outside diameter of the tube 40. The rotatable member 50 is held in its closed position by means of a latch 75. The cassette 30 itself is attached to the welding head body by a pair of spring latches or fasteners 80.

As shown clearly in FIGS. 1, 2 and 3, the hinge assembly 55 is placed such that the axis of rotation of the hinge is below a center line 85 to facilitate the opening of the rotatable clamp member 50 in limited space situations. Further, the cassette 30 may be mounted on the head assembly 25 with the hinge assembly either to the right, as shown in FIG. 1, or to the left, as shown in FIG. 2. When latched, the cassette 30 rests against a ground plate 90.

The fixed clamp member 45, the rotatable member 50 and the ground plate 90 may be made of a variety of materials, and in the preferred embodiment, they are made of aluminum.

Referring now to FIG. 3, the ground plate 90 is provided with a pair of internal fluid passageways 100 and 105, shown as dashed lines. These passageways are typically connected at their lower ends 110 and 115 to a source of and drain for cooling fluid, usually water. The other ends 120 and 125 exit at the side of the ground plate and are connected to hoses 130 and 135.

A cooling passageway 140 is drilled in the fixed member 45 and extends along the width of that member, from left to right, and then extends upwardly into a vertical extension 145 of the fixed member, which forms a part of the hinge assembly 55. As shown in FIG. 5, the vertical extension 145 includes a lateral opening 150 to accommodate a hinge pin 160. The passageway 140, as shown in FIGS. 3 and 5, is formed by drilling several intersecting openings in the fixed member. In some cases, those openings that extend outside the body of the member, but which do not form a part of the passageway itself, are closed by plugs 165. Cooling fluid is introduced into the passageway 140 by hose 130.

A cooling passageway 170 is formed in the rotatable member 50. This passageway begins and ends in a pair of downwardly extending extensions 175 and 180, which also form part of the hinge assembly 55. The extensions 175 and 180 include lateral openings 185 and 190 to accommodate the hinge pin 160. The passageway 170, which is also formed by drilling several intersecting openings in the rotatable member 50, begins at the extension 175 and passes from right to left across the upper part of the member, and then it returns from left to right, following generally the same path back to the extension 180 except that it is formed in a different plane. In forming the passageway 170, those openings that extend outside the body of the member, but which do not form a part of the passageway itself, are closed by plugs 165.

Figure 6:
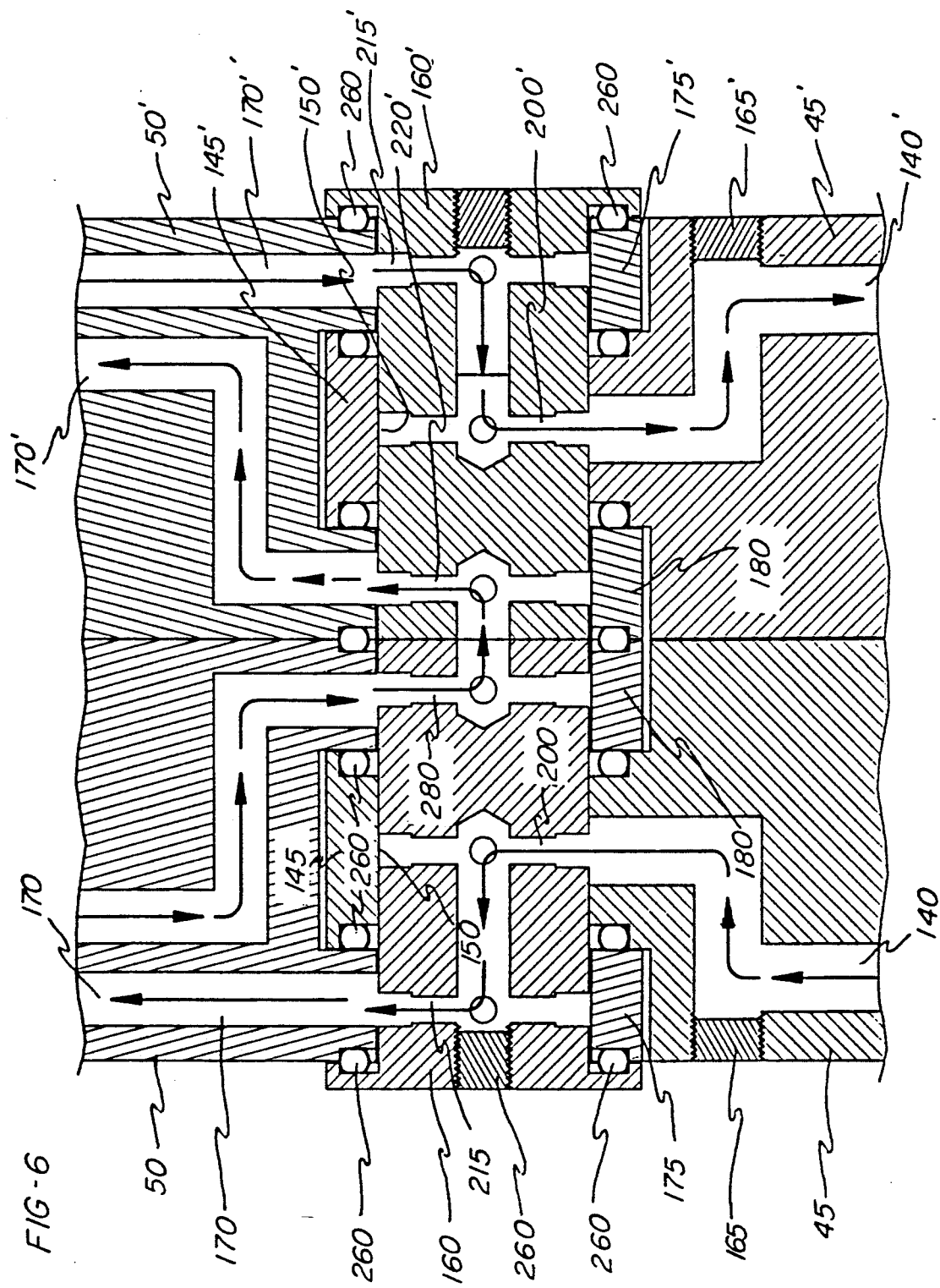
FIG. 6 is a partial side cross sectional view showing the cooling fluid path through the clamps of an assembled cassette assembly.

As shown in FIGS. 1, 4 and 6, the cassette 30 includes a pair of clamps. Thus far, only one clamp has been described; however, it is to be understood that the other clamp is identical in all functional aspects but is a mirror image of the clamp described. The other clamp will use the same reference numerals to described similar components as the one described, but with the addition of a prime. Thus, the other clamp includes, among other components, a fixed member 45', a rotatable member 50' and passageways 140' and 170'.

Referring now to FIG. 6, an assembled hinge assembly is shown in cross section. Cooling fluid flowing initially in passageway 140 flows in the direction of the arrow into the upward extension 145 and into a grove 200 formed in the hinge pin 160. As shown in more detail in FIG. 7, the hinge pin 160 is a cylinder having a flange 205 at one end thereof provided with a recess 210 for an O-ring seal. Three grooves 200, 215 and 220 are cut into the cylindrical body 230. Preferably, an axial opening 225 is formed from left to right, as shown in FIG. 7, from the left end of the hinge pin (as viewed) to just past groove 200. The left end of the opening is threaded to the groove 215 and a plug 232 is installed, thus allowing cooling fluid to pass from groove 200 through radial openings 235 to groove 215 through radial openings 240. Another axial opening 250 is formed at the other end of the hinge pin, and this allow fluid to pass from groove 220 through radial openings 245 to a similar groove 220' of the hinge pin 160' shown in FIG. 6.

Hinge pin 160 is press fit into the opening 150, the diameter of the hinge body 230 being the same as the diameter of the opening 150, and thus there in no relative rotation between the hinge pin and the upward extension 145 of the fixed member 45. On the other hand, the lateral openings 185 and 190 in the rotatable member 50 are slightly larger than the diameter of the hinge body 230, thus allowing the rotatable member 50 to rotate freely about the hinge pin.

A set of O-rings 260 provide a seal to prevent loss of cooling fluid. Since the welding head might be operated without water cooling in some circumstances, and the water cooling might fail, the O-rings 260 are made of a high temperature material, such as silicone or other equivalent material. In the preferred embodiment of this invention, the O-rings used are sold under the trademark Viton.

Returning to FIG. 6, cooling fluid, after flowing thought the fixed member 45, flows upwardly in passageway 140 into the groove 200 of hinge pin 160, through radial openings 235 into the axial opening 225, through radial openings 240 and groove 215 into the passageway 170 where the fluid flows into the rotatable member 50. After circulating through the rotatable member, the fluid exits the passageway 170 into groove 220 where it passes through radial openings 245 into the axial opening 250 and across to the mating hinge pin 160'. A mirror image of this process is repeated in the other rotatable member 50' and fixed member 45'. After passing through the fixed member 45', the cooling fluid is returned to the ground plate by hose 135.

In a preferred embodiment of this invention, water is used as the cooling fluid. Typically, water flow rates through the passageways are in the order of 0.5 to 1 liter/minute, with a pump pressure in the order of 55 psi. At these flow rates through passageways, which typically range in diameter from approximately 3 to 4 mm in diameter, the clamps can be maintained at under 140° F. during a welding operation of as long as five minutes.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A method of cooling the clamps of an orbital welding head wherein the clamps include a fixed component and a rotatable component which is hinged for rotation, the method comprising the steps of
    forming a cooling channel within the fixed and movable clamp components, and
    connecting the cooling channel of one clamp component with the cooling channel of the other clamp component through the hinge joining the two components.

2. In an orbital welding head for joining a tube to another component, said welding head including
    a welding electrode mounted to be orbited around the end of the tube, and
    at least one clamp for holding a tube in correct position with respect to the welding electrode, said clamp including a fixed member, a rotatable member, and a hinge assembly for joining said rotatable member to said fixed member to allow said rotatable member to be rotated and thus to allow the tube to be inserted into and removed from the welding head,
    the improvement comprising
    cooling channels formed in said fixed member and in said rotatable member for carrying cooling fluid through said members, and
    fluid channels in said hinge assembly for connecting the cooling channel in said fixed member with the cooling channel in said rotatable member to provide a path for cooling fluid to flow through each of the clamp members.

3. The welding head of claim 2 wherein the cooling channel in said rotatable member begins and ends at the hinge assembly,
    and wherein the cooling channels in the rotatable member are connected through fluid channels in the hinge assembly to a supply of cooling fluid thereby to provide a continuous path for fluid flow through the rotatable member regardless of its position.

4. In an orbital welding head for joining two tubes positioned end-to-end, said welding head including
    a welding electrode mounted to be orbited around the tubes, and
    a pair of clamps for holding the tubes in correct position with respect to each other and the welding electrode, each of said clamps including a fixed member, a rotatable member, and a hinge assembly for joining said rotatable member to said fixed member to allow said rotatable member to be rotated and thus to allow the tubes to be inserted into and removed from the welding head,
    the improvement comprising
    cooling channels formed in said fixed member and in said rotatable member for carrying cooling fluid through said members, and
    fluid channels in said hinge assembly for connecting the cooling channel in said fixed member with the cooling channel in said rotatable member to provide a path for cooling fluid to flow through each of the clamp members.

5. The welding head of claim 4 wherein a hinge assembly is provided for each of said pair of clamps and wherein said cooling fluid flows from the cooling channels in one fixed member through the fluid channels in said hinge assembly into its corresponding rotatable member, returns to said hinge assembly and flow into an adjacent hinge assembly, through the cooling channels in the rotatable member of the other clamp, through the fluid channels in said adjacent hinge assembly and into the corresponding fixed member.

6. The welding head of claim 4 wherein said hinge assembly includes a hinge pin that is press fit into an opening formed in said fixed member and wherein said rotatable member is free to rotate about said hinge pin.

* * * * *